(12) United States Patent
Roux et al.

(10) Patent No.: US 11,394,220 B2
(45) Date of Patent: Jul. 19, 2022

(54) SYSTEM AND METHOD OF PREPARING BATTERIES FOR TRANSPORT

(71) Applicant: Dell Products L.P., Round Rock, TX (US)

(72) Inventors: Phillip John Roux, Sutton, MA (US); Thomas Raymond Thibodeau, Whitinsville, MA (US); Michael Anthony Faulkner, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 52 days.

(21) Appl. No.: 17/065,348

(22) Filed: Oct. 7, 2020

(65) Prior Publication Data

US 2022/0109316 A1    Apr. 7, 2022

(51) Int. Cl.
*H02J 7/00* (2006.01)
(52) U.S. Cl.
CPC .......... *H02J 7/0048* (2020.01); *H02J 7/0013* (2013.01); *H02J 7/0063* (2013.01)
(58) Field of Classification Search
CPC ....... H02J 7/0048; H02J 7/0013; H02J 7/0063
See application file for complete search history.

(56) References Cited

PUBLICATIONS

UN Manual of Tests and Criteria, Sixth Revised Edition Sub-Section 38.3, Feb. 2016.
Coin Vibration Motor Coin Vibrating Motors Coin Vibrator Motors; Part No. C1026B002F, KOTL JinLong Machinery, Retrieved from http://www.vibratormotor.com/vib/c1026b002f.html, Retrieved on Nov. 9, 2009.
Vibration Motor, Vibration Motor, Micro Motor, Coin & Pancake Motors, Pager Motors; Part No. Z7AL2B1692082, KOTL JinLong Machinery, Retrieved from http://www.vibratormotor.com/vibZ7AL2B1692082.html, Retrieved on May 18, 2009.
Small Vehicles Powered by Lithium Batteries—Cargo Provisions, IATA Cargo, Dec. 29, 2015.
Transport of Lithium Metal and Lithium Ion Batteries, 2020 Lithium Battery Guidance Document, Revised forthe 2020 Regulation, APCS/Cargo, Dec. 12, 2019.
Lithium Battery Risk Assessment Guidance for Operators—$3^{rd}$ Edition, APCS/Cargo, Mar. 16, 2020.
Smart Baggage with Integrated Lithium Battery and/or Electroincs, , IATA, $1^{st}$ Edition 2017.

*Primary Examiner* — Carlos Amaya
(74) *Attorney, Agent, or Firm* — Baker Botts L.L.P.

(57) ABSTRACT

In one or more embodiments, one or more systems, one or more methods, and/or one or more processes may receive first user input; determine a first query for a state of charge (SOC) of a rechargeable battery based at least on the first user input; in response to the first query, provide first information indicating the SOC of the battery; receive second user input; determine an instruction, based at least on the second user input, to reduce the SOC of the battery; engage at least one load; after a period of time transpires, determine that the SOC of the battery is at or below a threshold SOC of the battery; and after determining that the SOC of the battery is at or below the threshold SOC, provide second information indicating the SOC of the battery is at or below the threshold SOC of the battery.

20 Claims, 10 Drawing Sheets

SYSTEM AND METHOD OF PREPARING BATTERIES FOR TRANSPORT

BACKGROUND

Field of the Disclosure

This disclosure relates generally to information handling systems and more particularly to preparing batteries for transport.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may receive first user input; may determine a first query for a state of charge (SOC) of a rechargeable battery based at least on the first user input; in response to determining the first query, may provide first information indicating the SOC of the rechargeable battery is not safe for transport; may receive second user input; may determine an instruction, based at least on the second user input, to reduce the SOC of the rechargeable battery to be at or below a threshold SOC of the rechargeable battery; may engage at least one load of the rechargeable battery; after a period of time transpires, may determine that the SOC of the rechargeable battery is at or below the threshold SOC of the rechargeable battery; and after determining that the SOC of the rechargeable battery is at or below the threshold SOC of the rechargeable battery, may provide second information indicating the SOC of the battery is at or below the threshold SOC of the rechargeable battery.

In one or more embodiments, one or more systems, one or more methods, and/or one or more processes may further: receive third user input; determine a second query for the SOC of the rechargeable battery based at least on the third user input; and provide third information indicating the SOC of the rechargeable battery. For example, providing the third information indicating the SOC of the battery may be performed in response to determining the second query. In one or more embodiments, receiving the first user input may include receiving the first user input from a first user, and receiving the third user input may include receiving the third user input from a second user, different from the first user.

In one or more embodiments, receiving the first user input may include receiving the first user input via an actuation of a switch of the rechargeable battery. In one or more embodiments, providing the first information indicating the SOC of the rechargeable battery may include providing first light emissions. In one or more embodiments, providing the second information indicating that the SOC of the rechargeable battery is at or below the threshold SOC of the battery may include providing second light emissions, different from the first light emissions. In one or more embodiments, providing the first information indicating the SOC of the battery may include providing first vibrations; and providing the second information indicating that the SOC of the battery is at or below the threshold SOC of the battery may include providing second vibrations.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

to FIG. 2B illustrates a second example of a rechargeable battery, according to one or more embodiments

DETAILED DESCRIPTION

Figure 1:
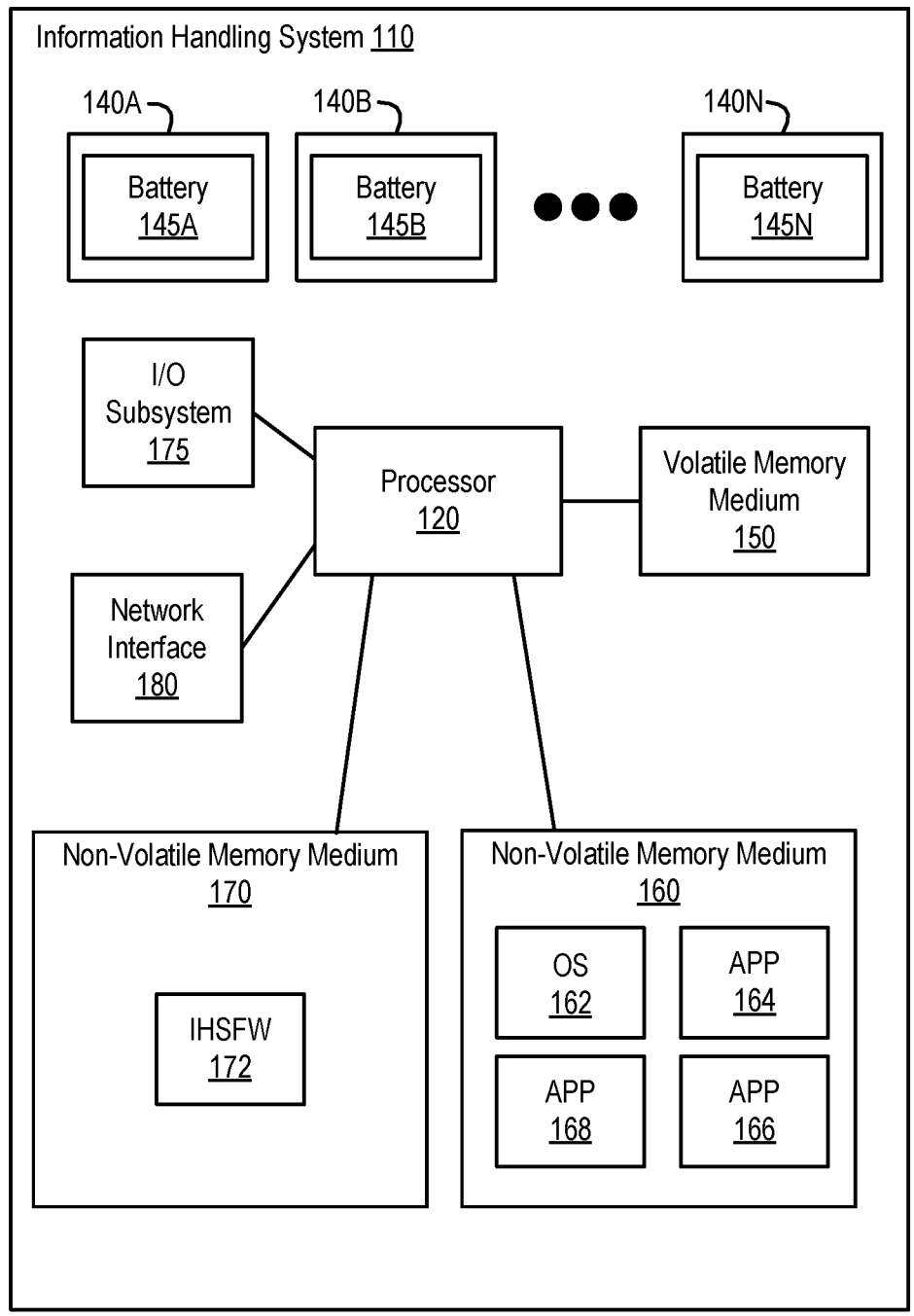
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, one or more rechargeable batteries may provide power to one or more information handling systems. For example, the one or more rechargeable batteries may provide power to one or more information handling systems when an external power source is not available to provide power to the one or more information handling systems. In one or more embodiments, the one or more rechargeable batteries may include a chemistry that may be considered volatile when subjected to one or more environments and/or one or more conditions. For example, a rechargeable battery that is considered volatile when subjected to one or more environments and/or one or more conditions may be considered a dangerous good during transport. For instance, a rechargeable battery that includes a lithium-based chemistry may be considered a dangerous good during transport. As one example, the rechargeable battery may include one or more lithium ion (Li-Ion) cells. As a second example, the rechargeable battery may include one or more lithium polymer cells. As another example, the rechargeable battery may include one or more lithium iron phosphate cells.

In one or more embodiments, to be transported (e.g., by air, sea, rail, roadway, etc.), a rechargeable battery may be conditioned for transport. For example, a standard, a regulation, and/or a statute may indicate a condition for the rechargeable battery to be safely transported. For instance, the rechargeable battery may be transported from a supplier to a product manufacturer, from a product manufacturer to a distributor, from a company to the field, from the field to the company, and/or from a user to a product manufacturer (e.g., for a return or upgrade of the rechargeable battery or a product that includes the rechargeable battery), among others. In one or more embodiments, a rechargeable battery may meet one or more provisions of UN Manual of Tests and Criteria, Sub-Section 38.3 (UN 38.3) before the battery may be transported. For example, UN 38.3 has been adopted around the world by regulators. In the future, other provisions may be applicable for rechargeable battery transportation.

In one or more embodiments, a state of charge (SOC) of a rechargeable battery may be at or below a maximum SOC threshold for transport before the battery can be transported. In one or more embodiments, the SOC of the rechargeable battery may include a level of charge of the rechargeable battery relative to a capacity the battery. For example, units of the SOC of the rechargeable battery may be percentage points. In one instance, a SOC of zero percent (0%) may indicate that the rechargeable battery is empty. In another instance, a SOC of one hundred percent (100%) may indicate that the rechargeable battery is fully charged.

In one or more embodiments, the rechargeable battery may include one or more systems that may indicate if the SOC of the rechargeable battery is at or below the maximum SOC threshold for transport. For example, the one or more systems of the rechargeable battery may include one or more of a device that may provide one or more light emissions when the battery is at or below the maximum SOC threshold for transport, a device that may produce one or more sounds when the rechargeable battery is at or below the maximum SOC threshold, and a device that may produce one or more tactile responses when the rechargeable battery is at or below the maximum SOC threshold for transport, among others. For instance, the one or more systems of the rechargeable battery may implement a "self-assessment" for safe transport of the rechargeable battery.

In one or more embodiments, the rechargeable battery may include one or more systems that may condition the rechargeable battery to be at or below the maximum SOC threshold for transport. For example, one or more of a user (e.g., a person) and an information handling system may actuate the one or more systems of the rechargeable battery to condition the rechargeable battery to be at or below the maximum SOC threshold for transport. For instance, the one or more systems of the rechargeable battery may implement a "self-adjustment" for safe transport. After the one or more systems of the rechargeable battery to condition the rechargeable battery to be at or below the maximum SOC threshold for transport, the rechargeable battery may meet one or more provisions to be transported from a first physical location to a second physical location, different from the first physical location.

In one or more embodiments, a battery backup device may include one or more rechargeable batteries and an intelligent battery management subsystem controller, among others. In one example, firmware processes and associated processes loaded within the intelligent battery management subsystem controller may measure, track, and/or store, in real-time, a current SOC that is available within rechargeable cells of the battery backup device. In another example, firmware processes and associated algorithms loaded within the intelligent battery management subsystem controller may retrieve a current SOC status and may, upon command, apply to the battery backup device an internal (or optionally externally provided) load to adjust (e.g., reduce) the SOC of the battery backup device to a prescribed safe level for cargo air transport.

In one or more embodiments, a rechargeable battery or a battery backup device may include a tactile switch (e.g., a pushbutton, a momentary switch, etc.), which may be accessible from an outer surface of the rechargeable battery or the battery backup device. For example, the tactile switch may be depressed by a user (e.g., a person) to query a current SOC status or to initiate a discharge to adjust (e.g., reduce) a SOC level for safe cargo air transport. In one or more embodiments, one or more visual indicators (e.g., a multiple color light emitting device or multiple light emitting devices) may display a "go" or a "no go" (e.g., pass or fail) SOC indication for safe transport status or may display an active discharging status to a user, in conjunction with the firmware processes for either action (e.g., provide query results, indicate a discharge in process, etc.).

In one or more embodiments, a process of the firmware processes may be invoked by an actuation of the tactile switch (e.g., a duration of a depression of the tactile switch) to initiate the prescribed SOC level check (e.g., a short duration of the depression) or to initiate an application of the load (e.g., a long duration of the depression) for SOC adjustment (e.g., reduction of SOC). One or more processes may illuminate appropriate one or more light emitting devices to distinguish a SOC state for safe transport, a SOC state for non-safe transport, or an active discharging state, among others. As an example, a SOC level for safe transport has been identified by IATA (International Air Transport Association) as no greater than thirty percent (30%).

In one or more embodiments, a rechargeable battery or a battery backup device may be labeled with text and/or graphics to instruct a user to utilize of the tactile switch to query for the suitability for safe transport by cargo air carrier or to initiate a discharge process to achieve a SOC that is safe for transport by cargo air carrier. For example, after an indicator illuminates, the user may interpret without a current rechargeable battery state or a current battery backup device state for disposition for transportation.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

As illustrated, IHS 110 may include receptacles 140A-140N. In one or more embodiments, rechargeable batteries 145A-145N may be inserted, respectively, inserted into receptacles 140A-140N. For example, a rechargeable battery 145 may be inserted into and/or may be removed from a receptacle 140. In one or more embodiments, one or more of rechargeable batteries 145A-145N may provide electrical power to one or more components of IHS 110. For example, the one or more components of IHS 110 may include one or more of processor 120, volatile memory medium 150, non-volatile memory medium 160, non-volatile memory medium 170, I/O subsystem 175, and network interface 180, among others.

In one or more embodiments, a battery 145 may provide electrical power to other devices. For example, a battery 145 may provide electrical power to a power supply. For instance, the power supply may include one or more receptacles 140. In one or more embodiments, the power supply may include an uninterruptable power supply (UPS). For example, the UPS may include one or more batteries 145. For instance, the UPS may include one or more receptacles 140 that may receive the one or more batteries 145. In one or more embodiments, the power supply may include a battery backup unit (BBU). For example, the BBU may include one or more batteries 145. For instance, the BBU may include one or more receptacles 140 that may receive the one or more batteries 145.

Figure 2A:
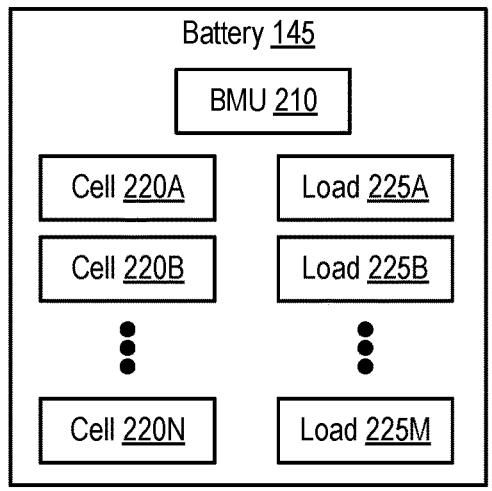
FIG. 2A illustrates an example of a rechargeable battery, according to one or more embodiments.

Turning now to FIG. 2A, an example of a rechargeable battery is illustrated, according to one or more embodiments. As shown, battery 145 may include a battery management unit (BMU) 210. In one or more embodiments, BMU 210 may include a battery management system (BMS). In one or more embodiments, BMU 210 may include a battery management subsystem. In one or more embodiments, BMU 210 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMU 210 may be or include an application processor. In one or more embodiments, BMU 210 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

As illustrated, battery 145 may include cells 220A-220N. In one or more embodiments, a cell 220 may store energy. For example, a cell 220 may store chemical energy. For instance, a cell 220 may provide electrical power from stored chemical energy. In one or more embodiments, a cell 220 may be rechargeable. For instance, after a cell 220 provides a first amount of energy, cell 220 may receive a second amount of energy, and cell 220 may store at least a portion of the second amount of energy. As an example, cell 220 may store the at least the portion of the second amount of energy as chemical energy. In one or more embodiments, cells 220A-220N may be coupled in one or more configurations. In one example, at least a portion of cells 220A-220N may be coupled in series. In another example, at least a portion of cells 220A-220N may be coupled in parallel. In one or more embodiments, a battery 145 that includes rechargeable cells 220 may be a rechargeable battery. Although battery 145 is illustrated as including cells 220A-220N, battery 145 may include any number of cells 220, according to one or more embodiments. For example, battery 145 may include one or more cells 220.

As shown, battery 145 may include loads 225A-225M. In one or more embodiments, energy of a cell 220 may be dissipated via a load 225. For example, load 225 may include one or more resistors. For instance, energy of a cell 220 may be dissipated via the one or more resistors of load 225. In one or more embodiments, one or more of loads 225A-225M may be utilized to reduce a SOC of battery 145 to be at or below a threshold SOC of battery 145 for safe transport. Although battery 145 is illustrated as including loads 225A-225M, battery 145 may include any number of loads 225, according to one or more embodiments.

Figure 2B:
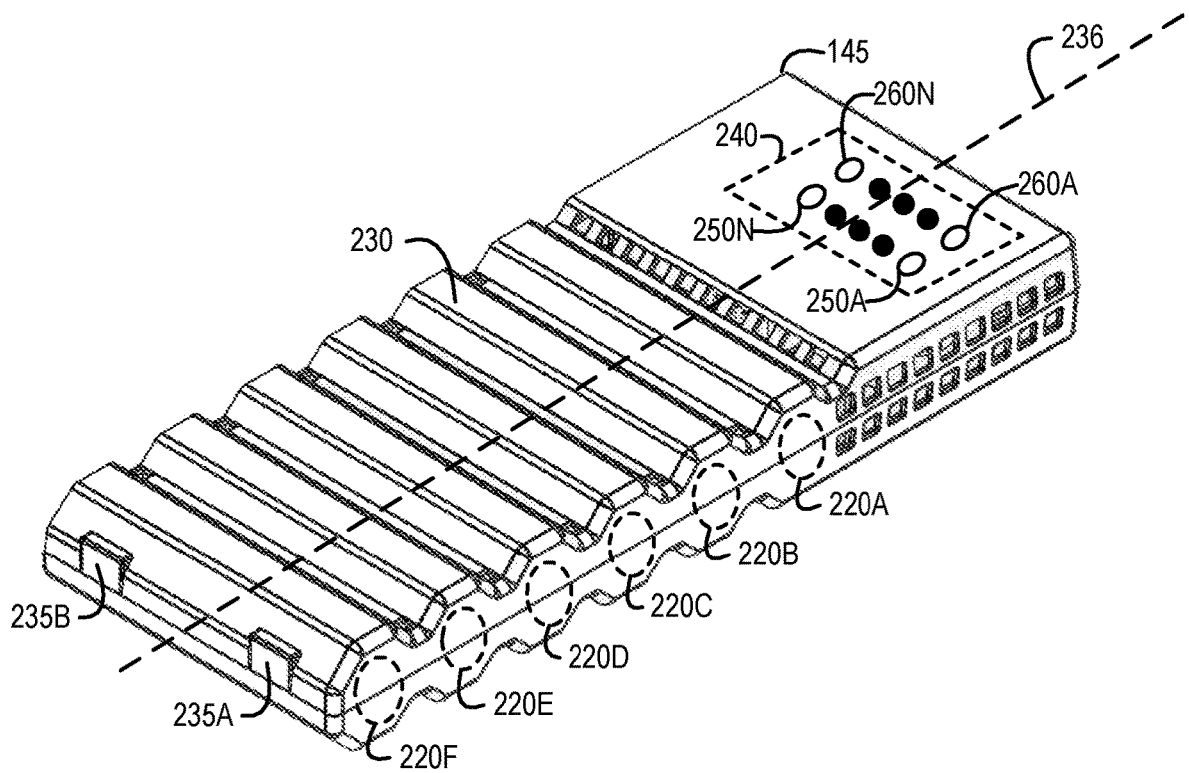
FIG. 2C illustrates a third example of a rechargeable battery, according to one or more embodiments.
FIG. 2D illustrates a fourth example of a rechargeable battery, according to one or more embodiments.
FIG. 2E illustrates another example of a rechargeable battery, according to one or more embodiments.

Turning now to FIG. 2B, a second example of a rechargeable battery is illustrated, according to one or more embodiments. As shown, a battery 145 may include a housing 230. In one or more embodiments, housing 230 may include an insulating material. In one example, insulating material may include plastic. In another example, insulating material may include fiberglass. As illustrated, battery 145 may include cells 220A-220F. For example, cells 220A-220F may be housed in housing 230.

As shown, battery 145 may include conductors 235A and 235B. For example, conductor 235A may be a positive pole of battery 145, and conductor 235B may be a negative pole of battery 145. In one instance, housing 230 may include conductors 235A and 235B. In another instance, conductors 235A and 235B may be fixed to or may be fixed within housing 230. As an example, battery 145 may be inserted, along a longitudinal axis 236, into a receptacle 140. For instance, IHS 110 may include the receptacle. In one or more embodiments, IHS 110 may include multiple receptacles 140. For example, one or more of batteries 145A-145N may be inserted into and/or removed from multiple receptacles 140A-140N.

As illustrated, battery 145 may include a user interface 240. In one example, battery 145 may receive user input, from a user (e.g., a person), via user interface 240. For instance, battery 145 may receive user input via one or more actuations of one or more of switches 250A-250N (e.g., momentary switches). In another example, battery 145 may provide information, to the user, via user interface 240. For instance, battery 145 may provide information via one or more light emitting devices 260A-260N. In one or more embodiments, a light emitting device 260 may provide one or more light emissions. In one example, a light emitting device 260 may include a light bulb. In another example, a light emitting device 260 may include a light emitting diode (LED). In one or more embodiments, a light emitting device 260 may include multiple light emitting diodes (LEDs). For example, a light emitting device 260 may emit multiple colors via its multiple LEDs. For instance, each of the multiple LEDs may emit light of a color that is different from another color of light emitted from another LED of the multiple LEDs.

Figure 2C:
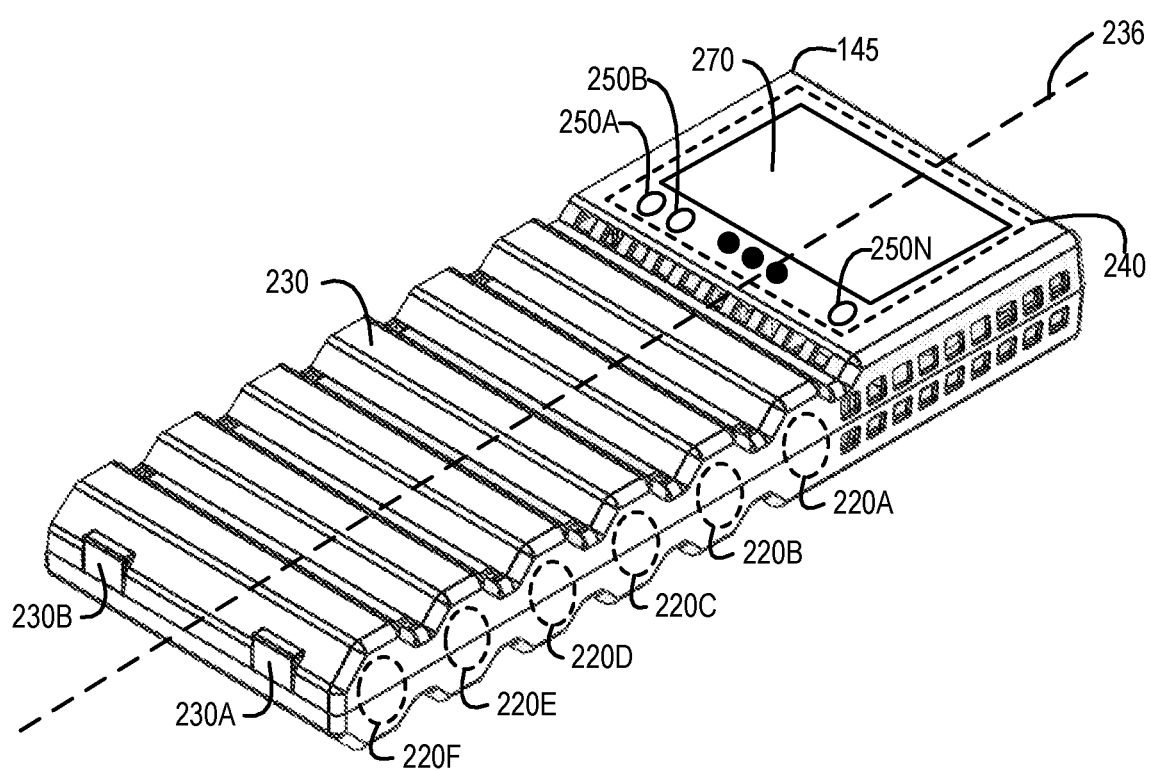

Turning now to FIG. 2C, a third example of a rechargeable battery is illustrated, according to one or more embodiments. As shown, user interface 240 may include a display 270 and switches 250A-250N. In one example, housing 230 may include display 270. In another example, display 270 may be mounted in and/or fixed to housing 230. In one or more embodiments, information may be provided to a user via display 270. In one example, display 270 may include a liquid crystal display (LCD). In another example, display 270 may include an organic light emitting diode (OLED) display. In one or more embodiments, battery 145 may display text and/or graphics via display 270.

Figure 2D:
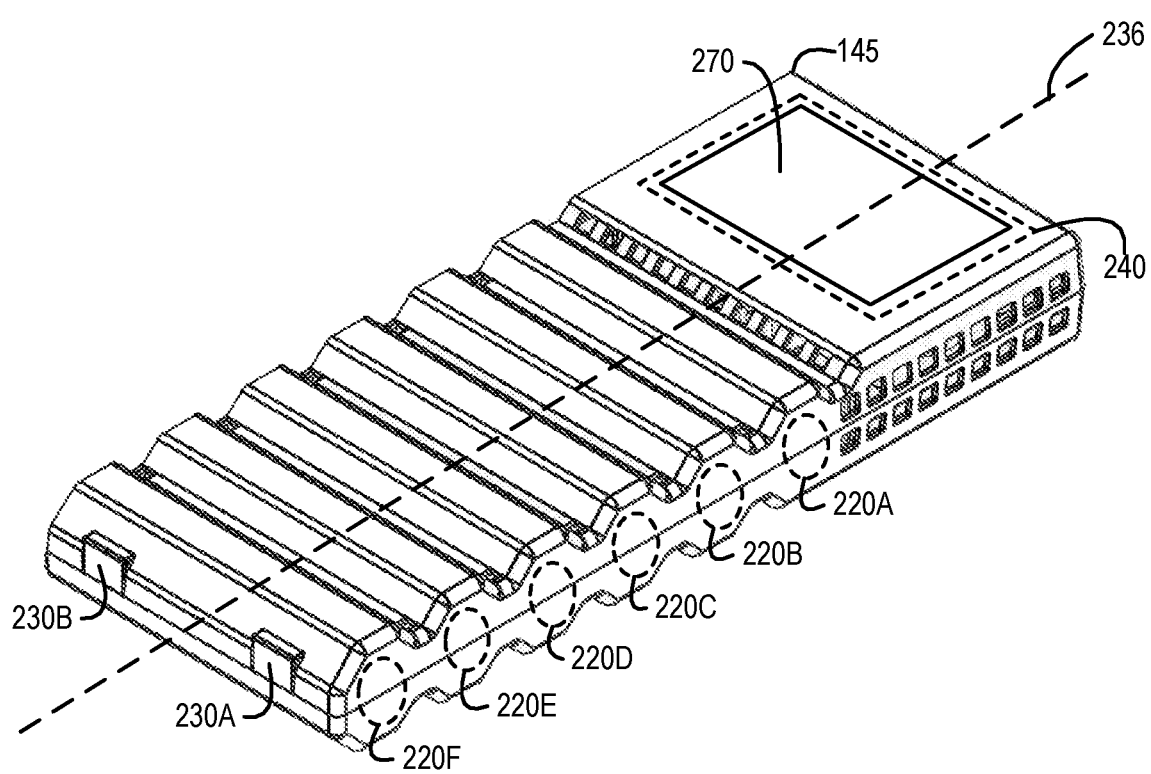

Turning now to FIG. 2D, a fourth example of a battery is illustrated, according to one or more embodiments. As shown, user interface 240 may include display 270. As illustrated, user interface 240 may not include one or more of switches 250A-250N. In one or more embodiments, display 270 may include a touch screen. For example, battery 145 may receive user input via the touch screen of display 270.

Figure 2E:
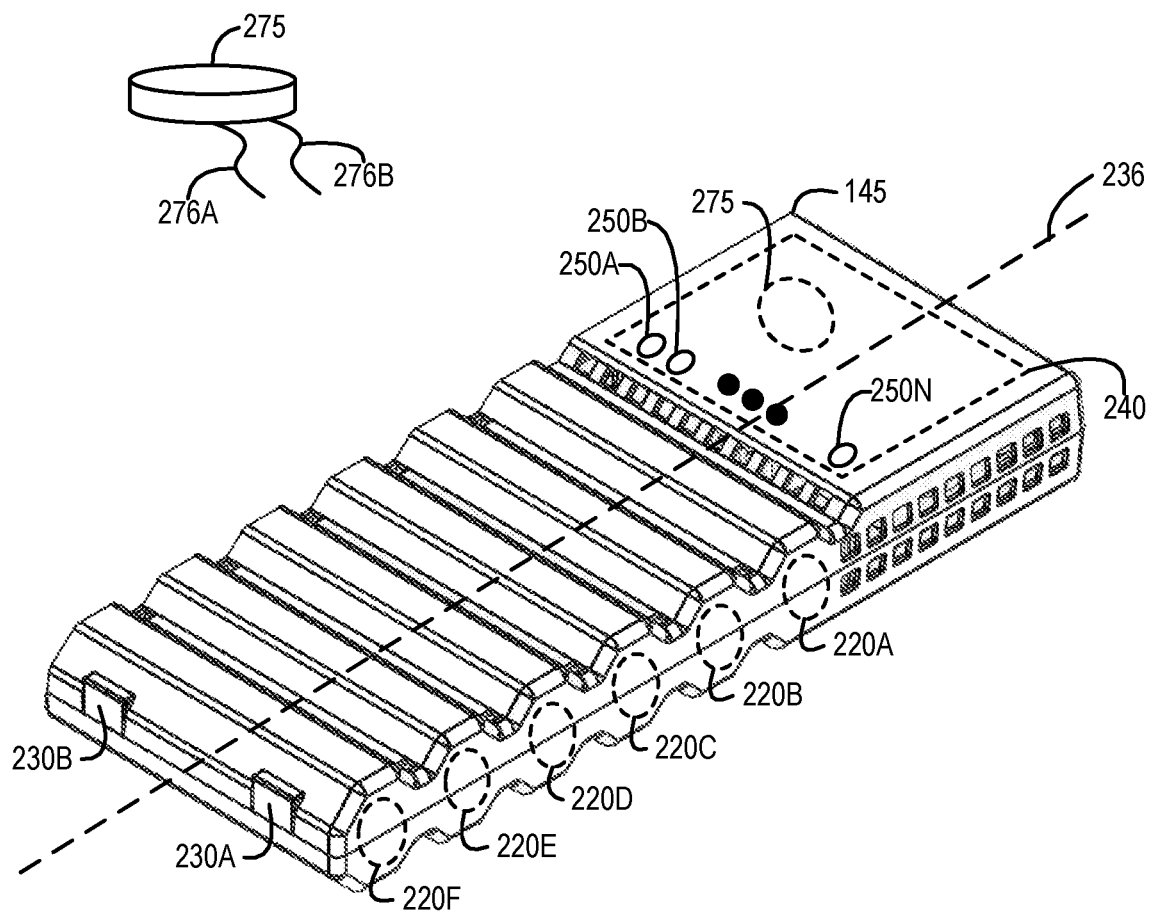

Turning now to FIG. 2E, another example of a rechargeable battery is illustrated, according to one or more embodiments. As shown, user interface 240 may include a haptic device 275. For example, haptic device 275 may include a motor that generates one or more vibrations and/or one or more sounds. As illustrated, leads 276A and 276B may be coupled to haptic device 275. For example, haptic device 275 may receive electrical power via leads 276A and 276B. For instance, haptic device 275 may be controlled via leads 276A and 276B.

Figure 3:
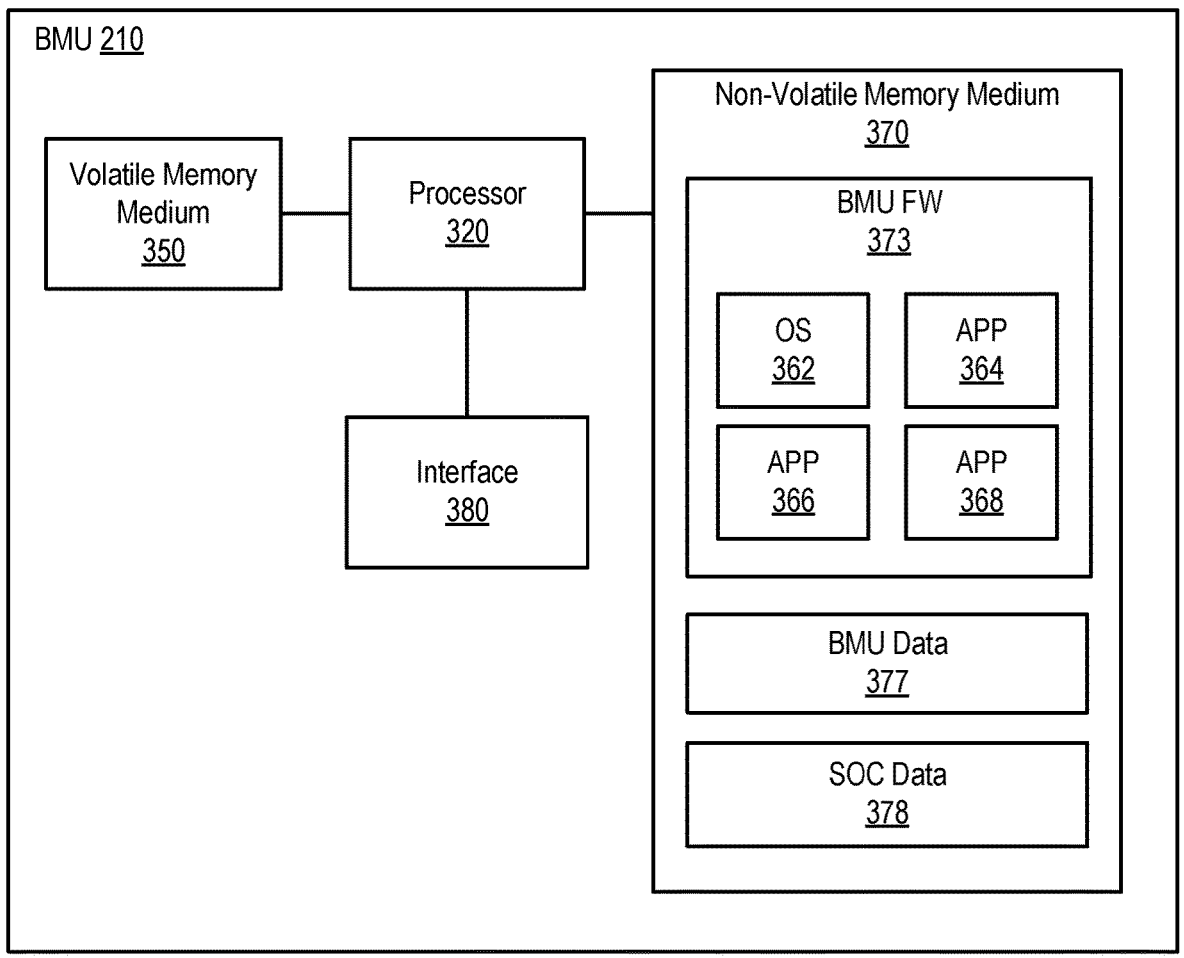
FIG. 3 illustrates an example of a battery management unit, according to one or more embodiments.

Turning now to FIG. 3, an example of a battery management unit is illustrated, according to one or more embodiments. As shown, BMU 210 may include a processor 320, a volatile memory medium 350, a non-volatile memory medium 370, and an interface 380. As illustrated, non-volatile memory medium 370 may include a BMU firmware (FW) 373, which may include an OS 362 and APPs 364-368, and may include BMU data 377. In one example, OS 362 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In another example, OS 362 may be or include a portable operating system interface (POSIX) compliant operating system. As illustrated, non-volatile memory medium 370 may include a SOC data 378. In one or more embodiments, SOC data 378 may include a value of a SOC of battery 145. For example, SOC data 378 may include a current value of a SOC of battery 145.

In one or more embodiments, interface 380 may include circuitry that enables communicatively coupling to one or more devices. In one example, interface 380 may include circuitry that enables communicatively coupling to one or more buses. For instance, the one or more buses may include one or more buses described herein, among others. In another example, interface 380 may include circuitry that enables one or more signals to be received. In one instance, interface 380 may include general purpose input/output (GPIO) circuitry, and the GPIO circuitry may enable one or more signals to be received and/or provided. For instance, interface 380 may include GPIO circuitry that may enable BMU 210 to provide and/or receive signals associated with other circuitry.

In one or more embodiments, interface 380 may be coupled to one or more components of user interface 240. For example, interface 380 may be coupled to one or more of switches 250A-250N, one or more of light emitting devices 260A-260N, display 270, and haptic devices 275, among others. For instance, leads 276A and 276B may be coupled to interface 380, which may permit BMU 210 to control haptic devices 275. In one or more embodiments, user interface 240 may include any combination of one or more of switches 250A-250N, one or more of light emitting devices 260A-260N, display 270, and/or haptic devices 275, among others.

In one or more embodiments, one or more of OS 362 and APPs 364-368 may include processor instructions executable by processor 320. In one example, processor 320 may execute processor instructions of one or more of OS 362 and APPs 364-368 via non-volatile memory medium 370. In another example, one or more portions of the processor instructions of the one or more of OS 362 and APPs 364-368 may be transferred to volatile memory medium 350, and processor 320 may execute the one or more portions of the processor instructions of the one or more of OS 362 and APPs 364-368 via volatile memory medium 350.

In one or more embodiments, processor 320 may execute instructions in accordance with at least a portion of one or more systems, at least a portion of one or more flowcharts, one or more methods, and/or at least a portion of one or more processes described herein. For example, non-volatile memory medium 370 and/or volatile memory medium 350 may store instructions that may be executable in accordance with at least a portion of one or more systems, at least a portion of one or more flowcharts, at least a portion of one or more methods, and/or at least a portion of one or more processes described herein. In one or more embodiments, processor 320 may execute instructions in accordance with at least a portion of one or more of systems, flowcharts, at least a portion of one or more methods, and/or at least a portion of one or more processes described herein. For example, non-volatile memory medium 370 and/or volatile memory medium 350 may store instructions that may be executable in accordance with at least a portion of one or more of systems, at least a portion of one or more flowcharts, at least a portion of one or more methods, and/or at least a portion of one or more processes described herein. In one or more embodiments, processor 320 may utilize BMU data 377. In one example, processor 320 may utilize BMU data 377 via non-volatile memory medium 370. In another example, one or more portions of BMU data 377 may be transferred to volatile memory medium 350, and processor 320 may utilize BMU data 377 via volatile memory medium 350.

Figure 4A:
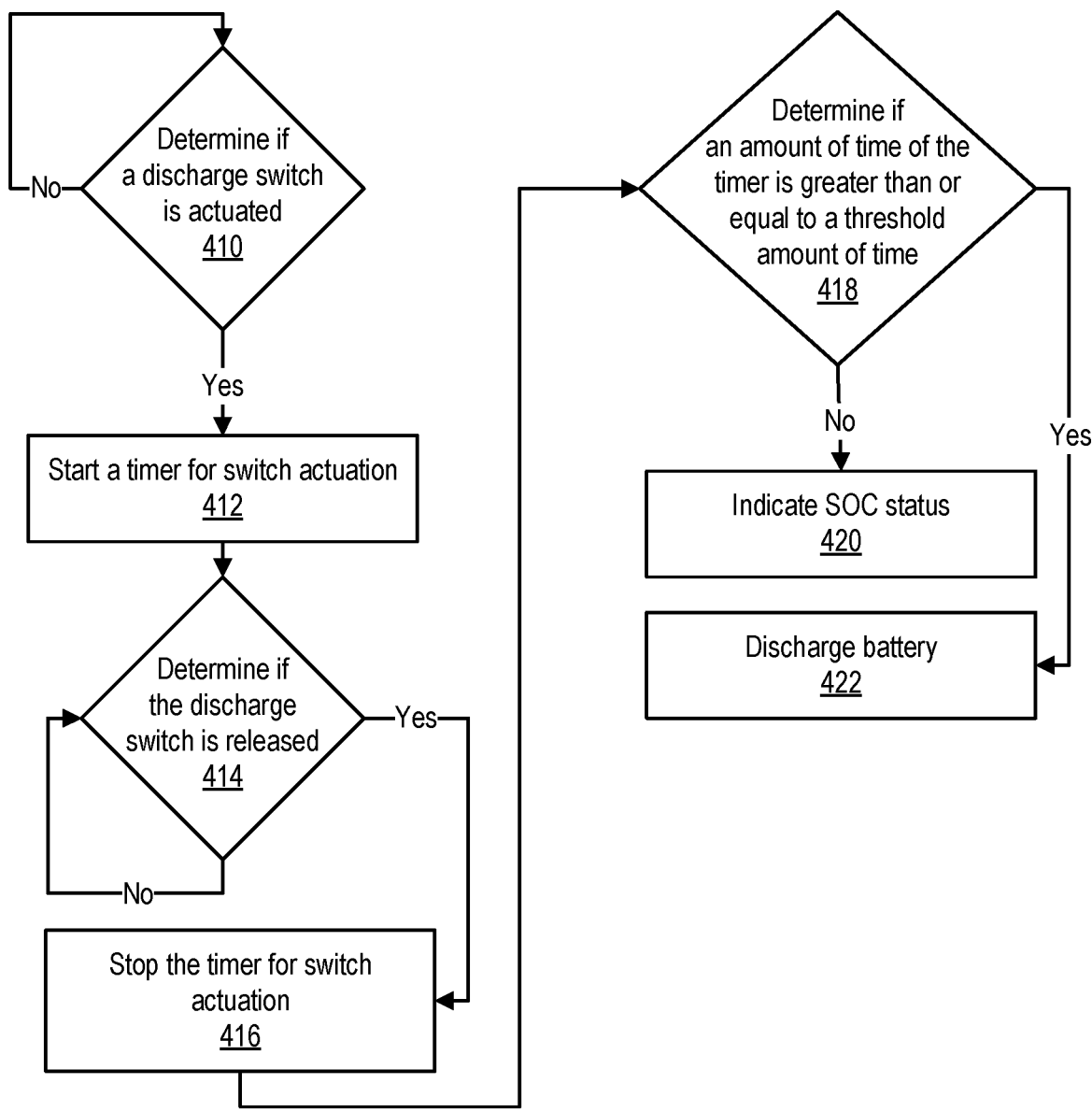
FIG. 4A illustrates an example of a method of operating a rechargeable battery, according to one or more embodiments.

Turning now to FIG. 4A, an example of a method of operating a rechargeable battery is illustrated, according to one or more embodiments. At 410, it may be determined if a discharge switch is actuated. For example, battery 145 may determine if a discharge switch 250A is actuated. For instance, BMU 210 may determine if a discharge switch 250A is actuated. At 412, a timer for switch actuation may be started. For example, battery 145 may start a timer for switch actuation. For instance, BMU 210 may start a timer for switch actuation.

At 414, it may be determined if the discharge switch is released. For example, battery 145 may determine if discharge switch 250A is released. For instance, BMU 210 may determine if discharge switch 250A is released. If the discharge switch is not released, the method may proceed to 414, according to one or more embodiments. If the discharge switch is released, the timer for switch actuation may be stopped, at 416. For example, battery 145 may stop the timer for switch actuation. For instance, BMU 210 may stop the timer for switch actuation.

At 418, it may be determined if an amount of time of the timer is greater than or equal to a threshold amount of time. For example, battery 145 may determine if an amount of time of the timer is greater than or equal to a threshold amount of time. For instance, BMU 210 may determine if an amount of time of the timer is greater than or equal to a threshold amount of time. If the amount of time of the timer is not greater than or equal to the threshold amount of time, SOC status may be indicated at 420. For example, battery 145 may indicate SOC status. For instance, BMU 210 may indicate SOC status. If amount of time of the timer is greater than or equal to the threshold amount of time, the rechargeable battery may be discharged, at 422. For example, battery 145 may discharge battery 145. For instance, BMU 210 may discharge battery 145. In one or more embodiments, discharging battery 145 may include discharging one or more cells 220 of battery 145.

Figure 4B:
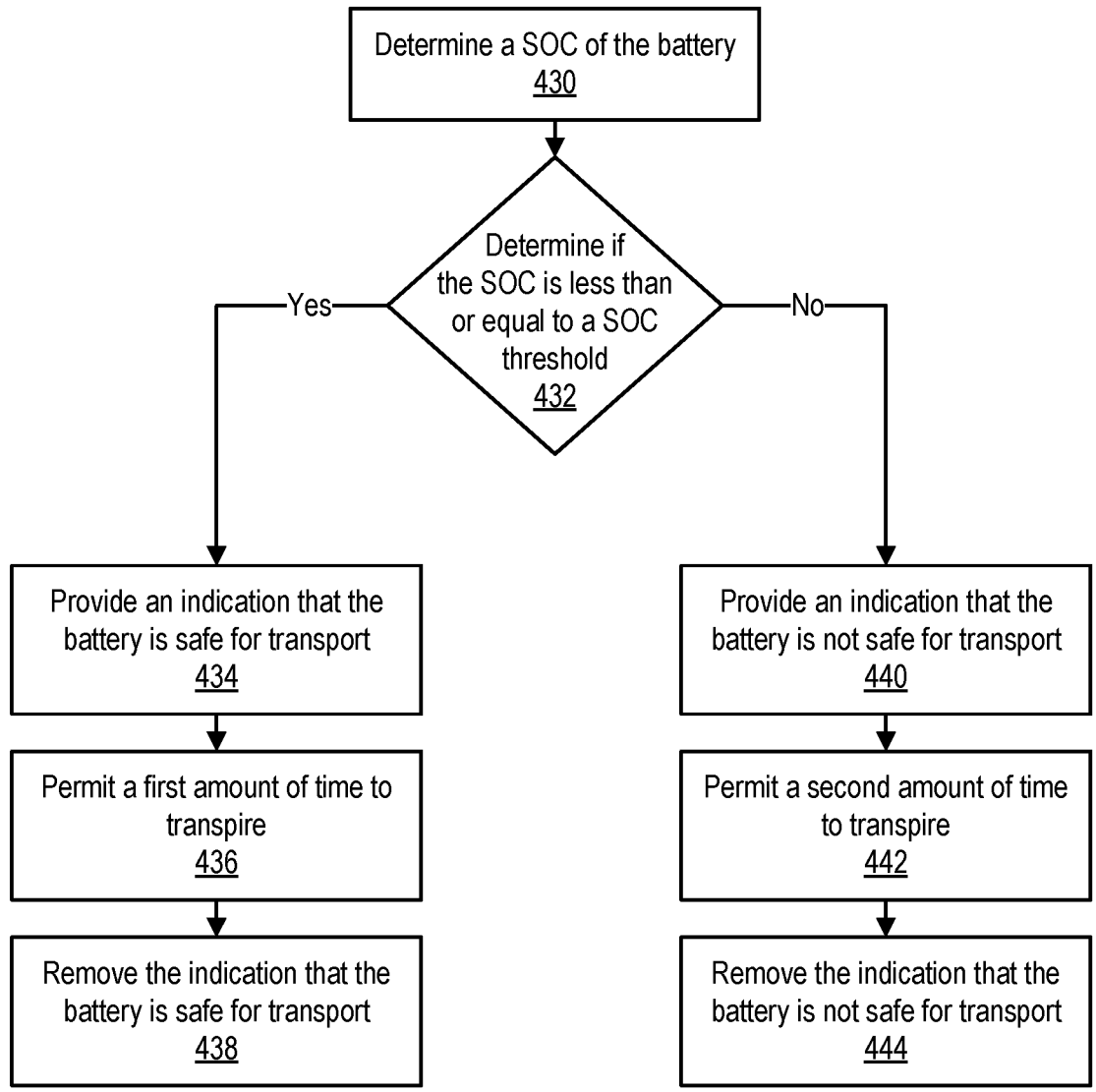
FIG. 4B illustrates an example of a method of indicating SOC status of a rechargeable battery, according to one or more embodiments.

Turning now to FIG. 4B, an example of a method of indicating SOC status of a rechargeable battery is illustrated, according to one or more embodiments. At 430, a SOC of the rechargeable battery may be determined. For example, battery 145 may determine a SOC of battery 145. For instance, BMU 210 may determine a SOC of battery 145. In one or more embodiments, determining a SOC of battery 145 may include accessing non-volatile memory medium 370 (illustrated in FIG. 3). For example, SOC data 378 may store the SOC of battery 145. In one instance, battery 145 may retrieve the SOC of battery 145 from SOC data 378 (shown in FIG. 3). In another instance, BMU 210 may retrieve the SOC of battery 145 from SOC data 378.

At 432, it may be determined if the SOC is less than or equal to a SOC threshold. For example, battery 145 may determine if the SOC is less than or equal to a SOC threshold. For instance, BMU 210 may determine if the SOC is less than or equal to a SOC threshold. In one or more embodiments, the SOC threshold may be configurable to a percentage a total amount of charge that battery 145 may store. For example, the SOC threshold may configured to be thirty percent (30%) of a total amount of charge that battery 145 may store.

If the rechargeable battery is safe for transport, an indication that the rechargeable battery is safe for transport may be provided, at 434. For example, battery 145 may provide an indication that battery 145 is safe for transport via user interface 240. For instance, BMU 210 may provide an indication that battery 145 is safe for transport via user interface 240.

In one or more embodiments, indicating that battery 145 is safe for transport may include indicating that the rechargeable battery is safe for transport via user interface 240. For example, indicating that battery 145 is safe for transport via user interface 240 may include indicating that battery 145 is safe for transport via one or more light emitting devices 260A-260N, display 270, and/or haptic device 275, among others. As an example, indicating that battery 145 is safe for transport may include providing first light emissions. In one instance, providing first light emissions may include providing light emissions of a first color. In another instance, providing first light emissions may include providing light emissions of a first blink pattern. As a second example, indicating that battery 145 is safe for transport may include displaying the SOC of battery 145. In one instance, displaying the SOC of battery 145 may include displaying text and/or a graphic that indicates that battery 145 is safe for transport. In another instance, displaying the SOC of battery 145 may include displaying text that shows a percentage (e.g., the SOC). As another example, indicating that battery 145 is safe for transport may include providing first vibrations. For instance, providing the first vibrations may include providing a first vibration pattern.

At 436, a first amount of time may be permitted to transpire. For example, battery 145 may permit a first amount of time to transpire. For instance, BMU 210 may permit a first amount of time to transpire. At 438, the indication that the battery is safe for transport may be removed. For example, battery 145 may remove the indication that battery 145 is safe for transport. For instance, BMU 210 may remove the indication that battery 145 is safe for transport.

If the rechargeable battery is not safe for transport, an indication that the rechargeable battery is not safe for transport may be provided, at 440. For example, battery 145 may provide an indication that battery 145 is not safe for transport. For instance, BMU 210 may provide an indication that battery 145 is not safe for transport.

In one or more embodiments, indicating that battery 145 is not safe for transport may include indicating that the battery is not safe for transport via user interface 240. For example, indicating that battery 145 is not safe for transport via user interface 240 may include indicating that battery 145 is not safe for transport via one or more light emitting devices 260A-260N, display 270, and/or haptic device 275, among others. As an example, indicating that battery 145 is not safe for transport may include providing second light emissions. In one instance, providing second light emissions may include providing light emissions of a second color, different from the first color. In another instance, providing second light emissions may include providing light emissions of a second blink pattern, different from the first blink pattern. As a second example, indicating that battery 145 is not safe for transport may include displaying the SOC of battery 145. In one instance, displaying the SOC of battery 145 may include displaying text and/or a graphic that indicates that battery 145 is not safe for transport. In another instance, displaying the SOC of battery 145 may include displaying text that shows a percentage (e.g., the SOC). As another example, indicating that battery 145 is not safe for transport may include providing second vibrations, different from the first vibrations. For instance, providing the first vibrations may include providing a second vibration pattern, different from the first vibration pattern.

At 442, a second amount of time may be permitted to transpire. For example, battery 145 may permit a second amount of time to transpire. For instance, BMU 210 may permit a second amount of time to transpire. In one or more embodiments, the second amount of time may be equal to the first amount of time. In one or more embodiments, the second amount of time may be different from the first amount of time. At 444, the indication that the battery is not safe for transport may be removed. For example, battery 145 may remove the indication that battery 145 is not safe for transport. For instance, BMU 210 may remove the indication that battery 145 is not safe for transport.

Figure 4C:
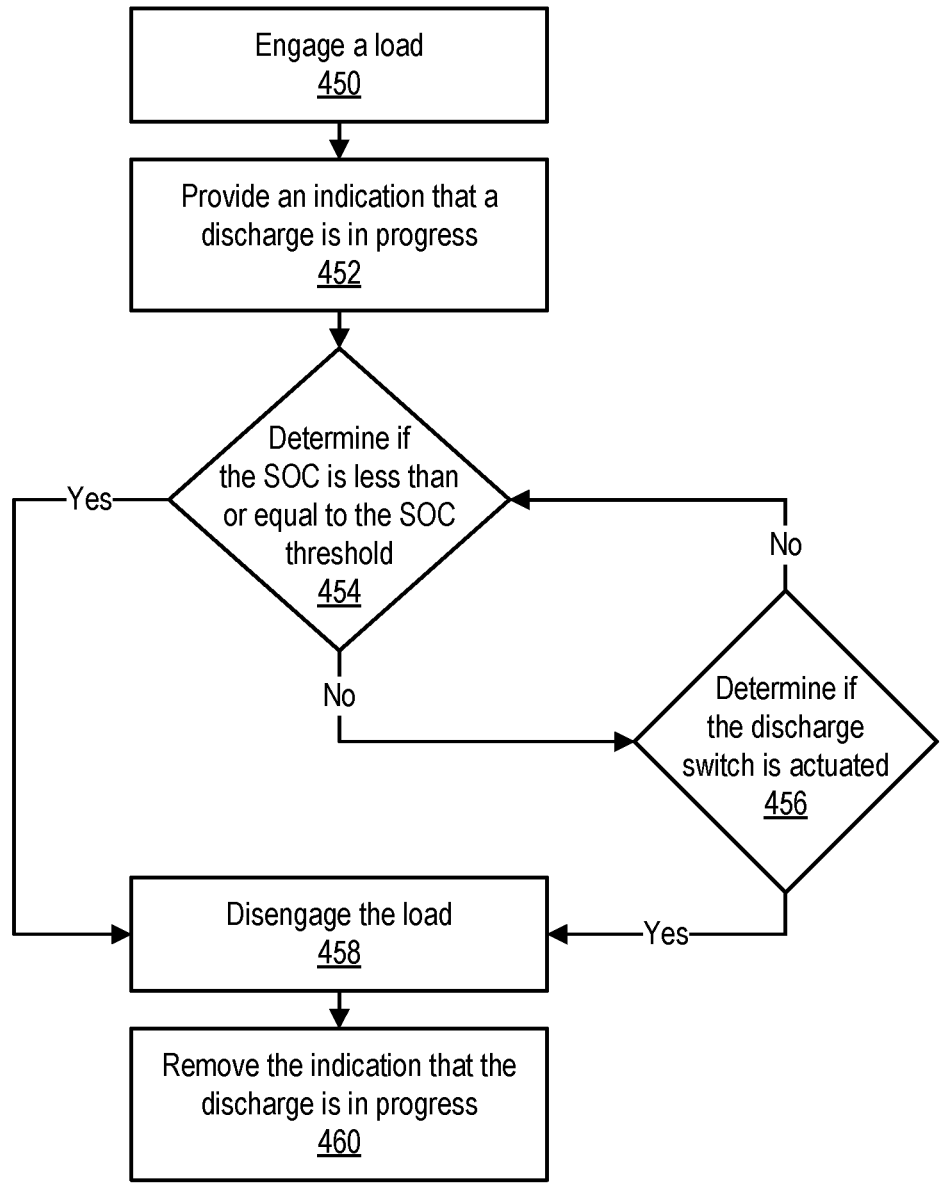
FIG. 4C illustrates an example of a method of discharging a rechargeable battery, according to one or more embodiments.

Turning now to FIG. 4C, an example of a method of discharging a rechargeable battery is illustrated, according to one or more embodiments. At 450, a load may be engaged. For example, battery 145 may engage a load. For instance, BMU 210 may engage a load. In one or more embodiments, engaging a load may include utilizing one or more of loads 225A-225N. In one example, one or more of cells 225A-225N may be coupled to one or more of loads 225A-225N. In one instance, battery 145 may utilize one or more switches to couple one or more of cells 225A-225N to one or more of loads 225A-225N. In another instance, BMU 210 may utilize one or more switches to couple one or more of cells 225A-225N to one or more of loads 225A-225N. In another example, one or more of cells 225A-225N may be coupled to one or more combinations of loads 225A-225N. In one instance, battery 145 may utilize one or more switches to couple one or more of cells 225A-225N to one or more combinations of loads 225A-225N. In another instance, BMU 210 may utilize one or more switches to couple one or more of cells 225A-225N to one or more combinations of loads 225A-225N.

In one or more embodiments, a switch utilized to couple a cell 220 to a load 225 may include a mechanically relay switch and/or a solid state switch. For example, a solid state switch may include one or more transistors. In one instance, a transistor may include a bipolar junction transistor (BJT). In another instance, a transistor may include a field effect transistor (FET).

At 452, an indication that a discharge is in progress may be provided. For example, battery 145 may provide an indication that a discharge is in progress. For instance, BMU 210 may provide an indication that a discharge is in progress. In one or more embodiments, indicating that battery 145 is being discharged may include indicating that the battery is being discharged via user interface 240. For example, indicating that battery 145 is being discharged via user interface 240 may include indicating that battery 145 is being discharged via one or more light emitting devices 260A-260N, display 270, and/or haptic device 275, among others. As an example, indicating that battery 145 is being discharged may include providing third light emissions. In one instance, providing third light emissions may include providing light emissions of a third color, different from the first color and different from the second color. In another instance, providing third light emissions may include providing light emissions of a third blink pattern, different from the first blink pattern and different from the second blink pattern. As a second example, indicating that battery 145 is being discharged may include displaying text and/or a graphic that indicates that battery 145 is being discharged. As another example, indicating that battery 145 is being discharged may include providing third vibrations. For instance, providing the third vibrations may include providing a third vibration pattern, different from the first vibration pattern and different from the second vibration pattern.

At 454, it may be determined if the SOC is less than or equal to the SOC threshold. For example, battery 145 may determine if the SOC is less than or equal to the SOC threshold. For instance, BMU 210 may determine if the SOC is less than or equal to the SOC threshold. In one or more embodiments, determining if the SOC is less than or equal to the SOC threshold may include comparing the SOC with the SOC threshold.

If the SOC is not less than or equal to the SOC threshold, it may be determined if the discharge switch is actuated, at 456. For example, battery 145 may determine if discharge switch 250A is actuated. For instance, BMU 210 may determine if discharge switch 250A is actuated. If the discharge switch is not actuated, the method may proceed to 454, according to one or more embodiments. If the discharge switch is actuated, the method may proceed to 458, according to one or more embodiments.

If the SOC is less than or equal to the SOC threshold, the load may be disengaged, at 458. For example, battery 145 may disengage the load. For instance, BMU 210 may disengage the load. At 460, the indication that the discharge is in progress may be removed. For example, battery 145 may remove the indication that the discharge is in progress. For instance, BMU 210 may remove the indication that the discharge is in progress.

Figure 5:
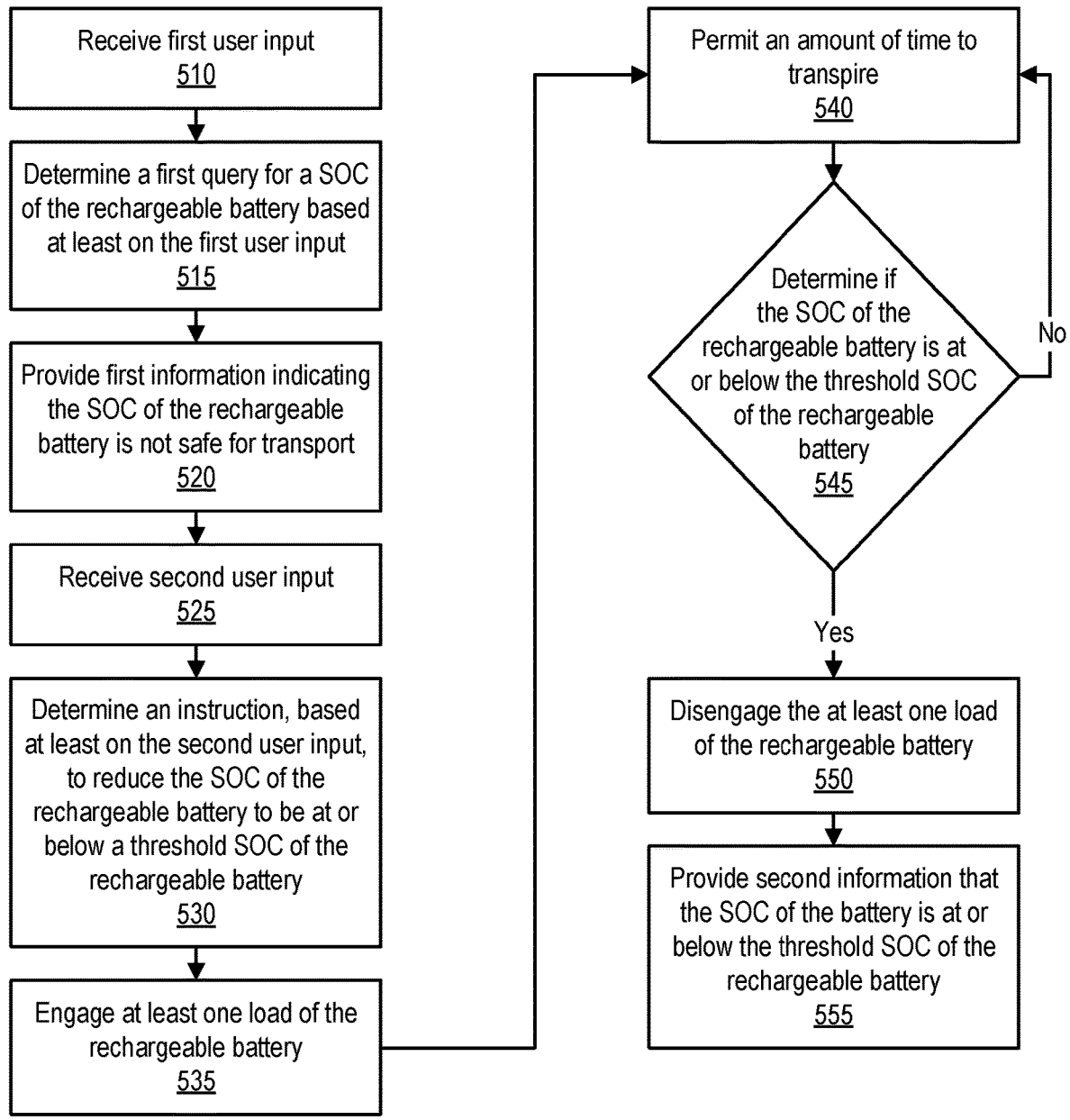
FIG. 5 illustrates another example of a method of operating a rechargeable battery, according to one or more embodiments.

Turning now to FIG. 5, another example of a method of operating a rechargeable battery is illustrated, according to one or more embodiments. At 510, first user input may be received. For example, battery 145 may receive first user input from a first user. For instance, BMU 210 may receive first user input from a first user. In one or more embodiments, the first user input may be received via user interface 240. For example, the first user input may be received via one or more of switches 250A-250N and/or display 270, among others. In one instance, the first user input may be received via an actuation of a switch 250. In another instance, the first user input may be received via an of at least a portion of a touch screen of display 270. In one or more embodiments, the first user input may be received from a first user.

At 515, a first query for a SOC of the rechargeable battery may be determined based at least on the first user input. For example, battery 145 may determine a first query for a SOC of battery 145 based at least on the first user input. For instance, BMU 210 may determine a first query for a SOC of battery 145 based at least on the first user input. At 520, first information indicating the SOC of the rechargeable battery is not safe for transport may be provided. For example, battery 145 may provide first information indicating the SOC of battery 145 is not safe for transport. For instance, BMU 210 may provide first information indicating the SOC of battery 145 is not safe for transport.

In one or more embodiments, providing the first information indicating the SOC of battery 145 may include providing the first information indicating the SOC of battery 145 via user interface 240. For example, providing the first information indicating the SOC of battery 145 via user interface 240 may include providing the first information indicating the SOC of battery 145 via one or more light emitting devices 260A-260N, display 270, and/or haptic device 275, among others. For instance, providing the first information indicating the SOC of battery 145 via one or more light emitting devices 260A-260N, display 270, and/or haptic device 275, among others, may indicate that battery 145 is not safe for transport.

As an example, providing the first information indicating the SOC of the rechargeable battery may include providing first light emissions. In one instance, providing first light emissions may include providing light emissions of a first color. The first color may indicate that the rechargeable battery is not safe for transport. In another instance, providing first light emissions may include providing light emissions of a first blink pattern. The first blink pattern may indicate that the rechargeable battery is not safe for transport. As a second example, providing the first information indicating the SOC of the rechargeable battery may include displaying the SOC of the rechargeable battery. In one instance, displaying the SOC of the rechargeable battery may include displaying text that indicates that the rechargeable battery is not safe for transport. In another instance, displaying the SOC of the rechargeable battery may include displaying text that shows a percentage (e.g., the SOC). As another example, providing the first information indicating the SOC of the rechargeable battery may include first providing vibrations. For instance, providing the first vibrations may include providing a first vibration pattern. In one or more embodiments, providing the first information indicating the SOC of the rechargeable battery may be performed in response to determining the first query. In one or more embodiments, the first information indicating the SOC of the rechargeable battery may be provided to the first user.

At 525, second user input may be received. For example, battery 145 may receive second user input. For instance, BMU 210 may receive second user input from the first user. In one or more embodiments, receiving the second user input may include receiving the second user input from the first user. In one or more embodiments, receiving the second user input may include receiving the second user input from the first user. At 530, an instruction may be determined, based at least on the second user input, to reduce the SOC of the rechargeable battery to be at or below a threshold SOC of the rechargeable battery. For example, battery 145 may determine an instruction, based at least on the second user input, to reduce the SOC of battery 145 to be at or below a threshold SOC of battery 145. For instance, BMU 210 may determine an instruction, based at least on the second user input, to reduce the SOC of battery 145 to be at or below a threshold SOC of battery 145.

In one or more embodiments, the threshold SOC of the rechargeable battery (e.g., battery 145) may be a percentage of a charge capacity of the rechargeable battery. For example, the threshold SOC of the rechargeable battery may be thirty percent (30%) of the charge capacity of the rechargeable battery. In one or more embodiments, the threshold SOC of the rechargeable battery may be configurable. In one example, when BMU 210 is programmed, the threshold SOC may be configured. For instance, BMU data 377 may be configured to store the threshold SOC. In another example, the threshold SOC may be configured or reconfigured via user interface 240. For instance, BMU data 377 may be configured or reconfigured, via user interface 240, to store the threshold SOC.

At 535, at least one load of the rechargeable battery may be engaged. For example, battery 145 may engage at least one load 225 of battery 145. For instance, BMU 210 may engage at least one load 225 of battery 145. In one or more embodiments, the at least one load 225 of battery 145 may include a single load 225. For example, the single load 225 may be engaged to each cell 220 of multiple cells 220 of battery 145 for an amount of time. For instance, the single load 225 may be engaged to a first cell 220 for an amount of time, the single load 225 may be engaged to a second cell 220 for the amount of time, the single load 225 may be engaged to a third cell 220 for the amount of time, etc.

In one or more embodiments, the at least one load 225 of battery 145 may include multiple loads 225. In one example, each of the multiple loads 225 may be engaged with a respective one of multiple cells 220 of battery 145 for an amount of time. In another example, a pair of multiple loads 225 may be engaged to a pair of multiple cells 220 of battery 145 for an amount of time. For instance, battery 145 may include two loads 225 and six cells 220. As an example, the two loads 225 may be engaged to a first respective two cells 220 for an amount of time, the two loads 225 may be engaged to a second respective two cells 220 for the amount of time, and the two loads 225 may be engaged to a third respective two cells 220 for the amount of time. In this fashion, if a number of loads 225 is less than a number of cells 220, cells 220 may be similarly discharged, according to one or more embodiments. In one example, in this fashion, if the discharge of battery 145 is interrupted, two or more of cells 220 may not be out of balance. In another example, in this fashion, if the discharge of battery 145 is interrupted, two or more of cells 220 may not be out of balance by a large amount (e.g., within one half of a volt, within 0.3 volts, within 0.2 volts, within 0.1 volts, etc.). In one or more embodiments, a number of cells may not be discharged simultaneously. For example, if a temperature of a first cell 220 exceeds a threshold temperature, a load 225 coupled to the first cell 220 may be disengaged, and load 225 may be engaged with a second cell 220.

At 540, an amount of time may be permitted to transpire. For example, battery 145 may permit an amount of time to transpire. For instance, BMU 210 may permit an amount of time to transpire. At 545, it may be determined if the SOC of the rechargeable battery is at or below the threshold SOC of the rechargeable battery. For example, battery 145 may determine if the SOC of battery 145 is at or below the threshold SOC of battery 145. For instance, BMU 210 may determine if the SOC of battery 145 is at or below the threshold SOC of battery 145.

If the SOC of the rechargeable battery is not at or below the threshold SOC of the rechargeable battery, the method may proceed to 540, according to one or more embodiments. For example, a subsequent amount of time may be permitted to transpire, at 540. If the SOC of the rechargeable battery is at or below the threshold SOC of the rechargeable battery, the at least one load may be disengaged, at 550. For example, battery 145 may disengage the at least one load 220. For instance, BMU 210 may disengage the at least one load 220.

At 555, second information indicating the SOC of the battery is at or below the threshold SOC of the rechargeable battery may be provided. For example, battery 145 may provide second information indicating the SOC of battery 145 is at or below the threshold SOC of battery 145. For instance, BMU 210 may provide second information indicating the SOC of battery 145 is at or below the threshold SOC of battery 145. In one or more embodiments, the second information indicating the SOC of the battery is at or below the threshold SOC of the rechargeable battery may be provided to the first user.

In one or more embodiments, providing the second information indicating the SOC of battery 145 may include providing the second information indicating the SOC of battery 145 via user interface 240. For example, providing the second information indicating the SOC of battery 145 via user interface 240 may include providing the second information indicating the SOC of battery 145 via one or more light emitting devices 260A-260N, display 270, and/or haptic device 275, among others. For instance, providing the second information indicating the SOC of battery 145 via one or more light emitting devices 260A-260N, display 270, and/or haptic device 275, among others, may indicate that battery 145 is safe for transport.

As an example, providing the second information indicating the SOC of the rechargeable battery may include providing second light emissions. In one instance, providing second light emissions may include providing light emissions of a second color, different from the first color. In another instance, providing second light emissions may include providing light emissions of a second blink pattern, different from the first blink pattern. As a second example, providing the second information indicating the SOC of the rechargeable battery may include displaying the SOC of the rechargeable battery. In one instance, displaying the SOC of the rechargeable battery may include displaying text that indicates that the rechargeable battery is safe for transport. In another instance, displaying the SOC of the rechargeable battery may include displaying text that shows a percentage (e.g., the SOC). As another example, providing the second information indicating the SOC of the rechargeable battery may include second providing vibrations. For instance, providing the second vibrations may include providing a second vibration pattern, different from the first vibration pattern.

In one or more embodiments, third user input may be received. For example, battery 145 may receive third user input. For instance, BMU 210 may receive third user input.

In one or more embodiments, the third user input may be received via user interface 240. For example, the third user input may be received via one or more of switches 250A-250N and/or display 270, among others. In one instance, the third user input may be received via an actuation of a switch 250. In another instance, the third user input may be received via an of at least a portion of a touch screen of display 270. In one or more embodiments, the third user input may be received from a second user, different from the first user. In one or more embodiments, the third user input may be received from the first user.

In one or more embodiments, a second query for the SOC of the rechargeable battery may be determined based at least on the third user input. For example, battery 145 may determine a second query for the SOC of the rechargeable battery based at least on the third user input. For instance, BMU 210 may determine a second query for the SOC of the rechargeable battery based at least on the third user input.

In one or more embodiments, third information indicating the SOC of the rechargeable battery may be provided. For example, battery 145 may provide third information indicating the SOC of the rechargeable battery. For instance, BMU 210 may provide third information indicating the SOC of the rechargeable battery. In one or more embodiments, providing the third information indicating the SOC of the battery may be performed in response to determining the second query.

In one or more embodiments, providing the third information indicating the SOC of battery 145 may include providing the third information indicating the SOC of battery 145 via user interface 240. For example, providing the third information indicating the SOC of battery 145 via user interface 240 may include providing the second information indicating the SOC of battery 145 via one or more light emitting devices 260A-260N, display 270, and/or haptic device 275, among others. For instance, providing the third information indicating the SOC of battery 145 via one or more light emitting devices 260A-260N, display 270, and/or haptic device 275, among others, may indicate that battery 145 is safe for transport.

As an example, providing the third information indicating the SOC of the rechargeable battery may include providing third light emissions. In one instance, providing third light emissions may include providing light emissions of the second color, different from the first color. In a second instance, providing third light emissions may include providing light emissions of a third color, different from the first color and different from the second color. In a third instance, providing third light emissions may include providing light emissions of the second blink pattern, different from the first blink pattern. In another instance, providing third light emissions may include providing light emissions of a third blink pattern, different from the first blink pattern and different from the second blink pattern.

As a second example, providing the third information indicating the SOC of the rechargeable battery may include displaying the SOC of the rechargeable battery. In one instance, displaying the SOC of the rechargeable battery may include displaying text that indicates that the rechargeable battery is safe for transport. In another instance, displaying the SOC of the rechargeable battery may include displaying text that shows a percentage (e.g., the SOC). As another example, providing the third information indicating the SOC of the rechargeable battery may include third providing vibrations. In one instance, providing the third vibrations may include providing the second vibration pattern, different from the first vibration pattern. In another instance, providing the third vibrations may include providing a third vibration pattern, different from the first vibration pattern and different from the second vibration pattern.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A rechargeable battery, comprising:
   one or more rechargeable cells;
   at least one load;
   at least one processor; and
   a non-transitory memory medium, coupled to the at least one processor, that stores instructions executable by the at least one processor, which when executed by the at least one processor, cause the rechargeable battery to:
   receive first user input;
   determine a first query for a state of charge (SOC) of the rechargeable battery based at least on the first user input;
   in response to determining the first query, provide first information indicating the SOC of the rechargeable battery is not safe for transport;
   receive second user input from the first user;
   determine an instruction, based at least on the second user input, to reduce the SOC of the rechargeable battery to be at or below a threshold SOC of the rechargeable battery;
   engage the at least one load of the rechargeable battery;
   after a period of time transpires, determine that the SOC of the rechargeable battery is at or below the threshold SOC of the rechargeable battery; and
   after determining that the SOC of the rechargeable battery is at or below the threshold SOC of the rechargeable battery, providing second information indicating the SOC of the battery is at or below the threshold SOC of the rechargeable battery.

2. The rechargeable battery of claim 1, wherein the instructions further cause the rechargeable battery to:
   receive third user input;
   determine a second query for the SOC of the rechargeable battery based at least on the third user input; and
   in response to determining the second query, provide third information indicating the SOC of the rechargeable battery.

3. The rechargeable battery of claim 2,
   wherein, to receive the first user input, the instructions further cause the rechargeable battery to receive the first user input from a first user; and
   wherein, to receive the third user input, the instructions further cause the rechargeable battery to receive the third user input from a second user, different from the first user.

4. The rechargeable battery of claim 1, further comprising:
   a switch coupled to the at least one processor;
   wherein, to receive the first user input, the instructions further cause the rechargeable battery to receive the first user input via an actuation of the switch.

5. The rechargeable battery of claim 1, wherein, to indicate the SOC of the battery, the instructions further cause the rechargeable battery to provide first light emissions.

6. The rechargeable battery of claim 5, wherein, to indicate to the first user information that the SOC of the battery is at or below the threshold SOC of the battery, the instructions further cause the rechargeable battery to provide second light emissions, different from the first light emissions.

7. The rechargeable battery of claim 1,
   wherein, to provide the first information indicating the SOC of the battery is not safe for transport, the instructions further cause the rechargeable battery to provide first vibrations; and
   wherein, to provide the second information indicating the SOC of the battery is at or below the threshold SOC of the battery, the instructions further cause the rechargeable battery to provide second vibrations.

8. A method, comprising:
receiving, by a rechargeable battery that includes one or more rechargeable cells, first user input;
determining, by the rechargeable battery, a first query for a state of charge (SOC) of the rechargeable battery based at least on the first user input;
in response to the determining the first query, providing, by the rechargeable battery, second information indicating the SOC of the battery is not safe for transport;
receiving second user input;
determining, by the rechargeable battery, an instruction, based at least on the second user input, to reduce the SOC of the rechargeable battery to be at or below a threshold SOC of the rechargeable battery;
engaging, by the rechargeable battery, at least one load of the rechargeable battery to at least one rechargeable cell of the one or more rechargeable cells;
after a period of time transpires, determining, by the rechargeable battery, that the SOC of the rechargeable battery is at or below the threshold SOC of the rechargeable battery; and
after the determining that the SOC of the rechargeable battery is at or below the threshold SOC of the rechargeable battery, providing, by the rechargeable battery, second information indicating the SOC of the battery is at or below the threshold SOC of the rechargeable battery.

9. The method of claim 8, further comprising:
receiving, by the rechargeable battery, third user input;
determining, by the rechargeable battery, a second query for the SOC of the rechargeable battery based at least on the third user input; and
in response to determining the second query, providing, by the rechargeable battery, third information indicating the SOC of the battery.

10. The method of claim 9,
wherein the receiving the first user input includes receiving the first user input from a first user; and
wherein the receiving the third user input includes receiving the third user input from a second user, different from the first user.

11. The method of claim 8, wherein the receiving the first user input includes receiving the first user input via an actuation of a switch of the rechargeable battery.

12. The method of claim 8, wherein the providing the first information indicating the SOC of the rechargeable battery is not safe for transport includes providing first light emissions.

13. The method of claim 12, wherein the providing the second information indicating the SOC of the rechargeable battery is at or below the threshold SOC of the battery includes providing second light emissions, different from the first light emissions.

14. The method of claim 8,
wherein the providing the first information indicating the SOC of the battery is not safe for transport includes providing first vibrations; and
wherein the providing the second information indicating information the SOC of the battery is at or below the threshold SOC of the battery includes providing second vibrations, different from the first vibrations.

15. A battery management unit, comprising:
at least one processor; and
a non-transitory memory medium, coupled to the at least one processor, that stores instructions executable by the at least one processor, which when executed by the at least one processor, cause the battery management unit to:
receive first user input;
determine, based at least on the first user input, a first query for a state of charge (SOC) of a rechargeable battery that includes one or more rechargeable cells;
in response to determining the first query, provide first information indicating the SOC of the rechargeable battery is not safe for transport;
receive second user input;
determine an instruction, based at least on the second user input, to reduce the SOC of the rechargeable battery to be at or below a threshold SOC of the rechargeable battery;
engage at least one load of the rechargeable battery to at least one rechargeable cell of the one or more rechargeable cells;
after a period of time transpires, determine that the SOC of the rechargeable battery is at or below the threshold SOC of the rechargeable battery; and
after determining that the SOC of the rechargeable battery is at or below the threshold SOC of the rechargeable battery, provide second information indicating the SOC of the battery is at or below the threshold SOC of the rechargeable battery.

16. The battery management unit of claim 15, wherein the instructions further cause the battery management unit to:
receive third user input;
determine a second query for the SOC of the rechargeable battery based at least on the third user input; and
in response to determining the second query, provide third information indicating the SOC of the rechargeable battery.

17. The battery management unit of claim 16,
wherein, to receive the first user input, the instructions further cause the battery management unit to receive the first user input from a first user; and
wherein, to receive the third user input, the instructions further cause the battery management unit to receive the third user input from a second user, different from the first user.

18. The battery management unit of claim 15, wherein, to receive the first user input, the instructions further cause the battery management unit to receive the first user input via an actuation of a switch of the rechargeable battery coupled to the at least one processor.

19. The battery management unit of claim 15, wherein, to indicate the SOC of the battery, the instructions further cause the battery management unit to provide first light emissions.

20. The battery management unit of claim 15,
wherein, to provide the first information indicating the SOC of the rechargeable battery is not safe for transport, the instructions further cause the battery management unit to provide first vibrations; and
wherein, to provide the second information indicating the SOC of the battery is at or below the threshold SOC of the rechargeable battery, the instructions further cause the battery management unit to provide second vibrations, different from the first vibrations.

* * * * *